United States Patent [19]

Iizuka et al.

[11] Patent Number: 4,998,790
[45] Date of Patent: Mar. 12, 1991

[54] OPTICAL SCANNING APPARATUS

[75] Inventors: Takashi Iizuka; Mitsunori Iima; Akira Morimoto, all of Tokyo, Japan

[73] Assignee: Asahi Kogaku Kogyo K.K., Tokyo, Japan

[21] Appl. No.: 485,904

[22] Filed: Feb. 27, 1990

[30] Foreign Application Priority Data

Feb. 28, 1989 [JP] Japan .................................. 1-48368
Mar. 13, 1989 [JP] Japan .................................. 1-60515

[51] Int. Cl.⁵ .............................................. G02B 26/10
[52] U.S. Cl. ..................................... 350/6.1; 350/6.8; 250/235
[58] Field of Search ............... 350/6.1, 6.2, 6.3, 6.4, 350/6.5, 6.6, 6.7, 6.8, 6.9, 6.91; 250/234, 235, 363.01; 346/157; 378/146, 99

[56] References Cited

U.S. PATENT DOCUMENTS 4,294,506 10/1981 Hattori ................................. 350/6.8
4,523,801 6/1985 Baba et al. ........................... 350/6.8

FOREIGN PATENT DOCUMENTS 63-146015 6/1988 Japan .
63-61824 11/1988 Japan .

Primary Examiner—Bruce Y. Arnold
Assistant Examiner—Loha Ben
Attorney, Agent, or Firm—Sughrue, Mion, Zinn, Macpeaks & Seas

[57] ABSTRACT

An optical scanning apparatus has a semiconductor laser which produces a divergent beam of light. A collimator lens makes the beam of light parallel, a cylindrical lens shapes the beam, and a polygonal deflector deflects the beam through a scanning lens and onto a rotating drum containing an exposure plane. The amount of light reflected back into the semiconductor laser is reduced by forming a slit either inside of the collimator lens or inside of a housing of the cylindrical lens.

11 Claims, 12 Drawing Sheets

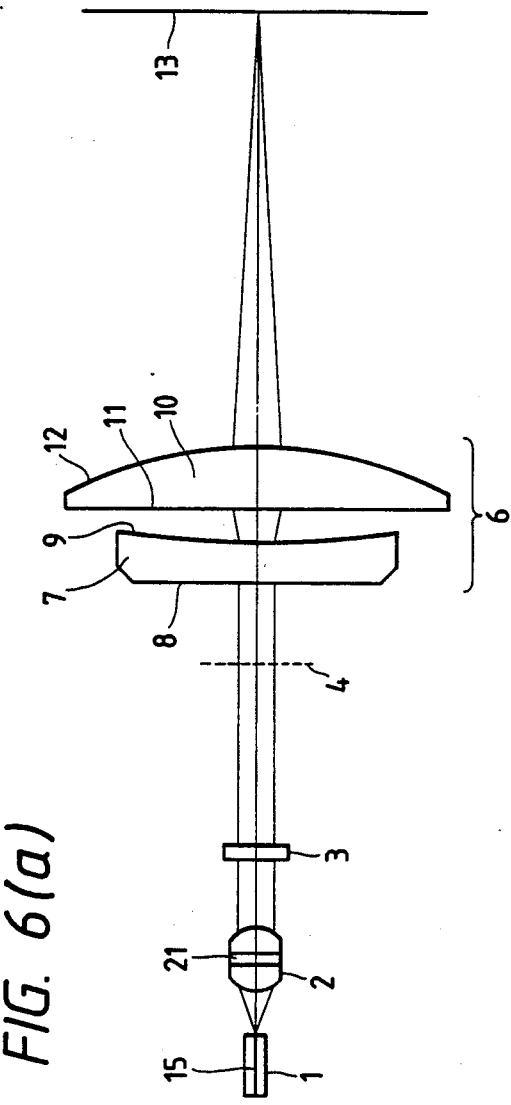
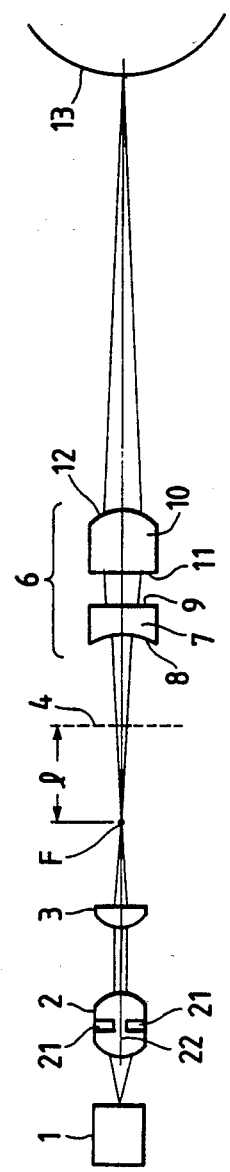
FIG. 6(a)
FIG. 6(b)

OPTICAL SCANNING APPARATUS

BACKGROUND OF THE INVENTION

The present invention relates to an optical scanning apparatus suitable for use with a laser beam printer or a like device.

FIG. 2 shows a prior art optical scanning apparatus such as the one described in Japanese Patent Publication No. 63-61824. Laser light emitted from a laser oscillator 101 typically using helium or argon as an active material is converged by a lens 102 and sent into an optical modulator 104 via a mirror 103. The optical modulator 104 modulates the laser light in accordance with a recording signal. The modulated laser light is reflected by a mirror 105 and admitted into a collimator lens 106 where it is converted to parallel rays. The parallel rays of light emerging from the collimator lens 106 pass through a slit plate 107 and impinge on a reflecting surface of a rotating polygonal mirror 108. The reflected light passes through an $f\theta$ lens 109 and illuminates the surface of a drum 110. The $f\theta$ lens 109 having a focal length f not only converges the collimated light at a point on the drum surface but also insures that the image height y, or the distance from the optical axis of the $f\theta$ lens to the spot on the drum surface is proportional to the incident angle, $\theta$, of the beam admitted into the $f\theta$ lens ($y=f\theta$).

Since the polygonal mirror 108 rotates about its axis 111, the surface of the drum 110 is scanned by the spot moving in the main scanning direction (i.e., parallel to the rotating axis 112 of the drum 110). Further, the drum 110 rotates about its axis 112 to cause the spot to scan the drum surface in the sub-scanning direction (i.e., perpendicular to the rotating axis 112). Thus, an image is recorded on the exposure plane of the drum 110 in accordance with the recording signal.

The spot diameter S of light converged by the $f\theta$ lens is represented by:

$$S = k\lambda F = k\lambda f/D \quad (1)$$

where $\lambda$ is the wavelength of light, F is an F number which is equal to the focal length f of the $f\theta$ lens divided by the diameter of incident beam D, and k is a proportionality constant. As shown in FIG. 3, k assumes a greater value when less vignetting occurs in light distribution (FIG. 3a) than it does when extensive vignetting occurs (FIG. 3b).

As is obvious from Equation (1), the spot diameter S is in inverse proportion to the diameter of incident beam D if the focal length of the $f\theta$ lens is the same. Hence, in order to obtain a beam spot that has a short dimension in the main scanning direction and that has a long dimension in the sub-scanning direction, as shown in FIG. 4, it is necessary to use a slit plate 107 that performs beam shaping in such a way that the cross-sectional shape of the beam is long in the main scanning direction while it is short in the sub-scanning direction. Consequently, the spot formed on the drum 110 is short in the main scanning direction and long in the sub-scanning direction. Thus, if a scanning operation in the main scanning direction is followed by rotation of the drum 110 by a predetermined pitch to perform the next scanning operation, the two regions of scanning will partly overlap to avoid the occurrence of an unscanned region.

However, if the spot shaping slit plate is positioned in the optical path of collimated light, the laser light reflected by the slit plate will return to the laser oscillator 101 to instabilize its operation. Further, the need to provide a separate slit plate increases the number of components and fabrication steps, thus leading to a higher production cost.

SUMMARY OF THE INVENTION

A principal object of the present invention is to stabilize the operation of a light source by radiating the light returning to it and to reduce the production cost by decreasing the number of necessary components and fabrication steps.

The optical scanning apparatus of the present invention comprises a light source emitting recording laser light, a collimator lens for collimating the laser light emitted from the light source, a deflector with which the laser light emerging from the collimator lens is deflected in the main scanning direction, and a scanning lens with which the laser light deflected by the deflector is converged to scan an exposure plane moving in the sub-scanning direction, at least part of the collimator lens is shaped to have different diameters in the main and sub-scanning directions.

According to a second embodiment of the present invention, the optical scanning apparatus comprises a semiconductor laser emitting laser light, a collimator lens for collimating the divergent laser light emitted from the semiconductor laser, an anamorphic optical unit that does not have power in a cross section of the laser beam emerging from the collimator lens in the main scanning direction but which has power in a cross section in the sub-scanning direction, a deflector with which the laser light emerging from the anamorphic optical unit is deflected in the main scanning direction, an anamorphic scanning lens unit that converges the laser light from the deflector to scan an exposure plane and which has different degrees of power in the main and sub-scanning directions, and a slit positioned in the optical path of light converged by the anamorphic optical unit.

The laser light emitted from a light source such as a semiconductor laser is collimated by the collimator lens and is admitted directly into the deflector. If an anamorphic optical unit typically composed of a cylindrical lens, is inserted behind the collimator lens, the collimated light is admitted into the deflector after it has been subjected to action in the sub-scanning direction. The light reflected by the deflector, which is typically composed of a rotating polygonal mirror, is admitted into the scanning lens. If the scanning lens, which is typically composed of an $f\theta$ lens is a spherical lens with no cylindrical lens inserted therewith, it has the same degree of power in the main and sub-scanning directions. If, on the other hand, a cylindrical lens is inserted to make the scanning lens also anamorphic, it has different degrees of power in the main and sub-scanning directions. As a result, the light emerging from the scanning lens is converged at a point on the exposure plane in both the main and sub-scanning directions. In order to obtain a spot of a predetermined shape on the exposure plane, the rays of incident light are restricted by the collimator lens. To this end, the diameter of at least part of the collimator lens is set at different values in the main and sub-scanning directions.

Hence, reflection for restricting the rays of light will take place in the optical path of divergent light and unlike in the case where the slit plate is positioned in the optical path of collimated light, specular reflection will not be caused, thus contributing to a reduction in the amount of light that is reflected to return to the semiconductor laser.

According to the second embodiment of the present invention, the laser light emitted from the semiconductor laser is collimated by the collimator lens and is thereafter subjected to action in the sub-scanning direction by means of the anamorphic optical unit, which is typically composed of a cylindrical lens. The resulting anamorphic light is deflected by a deflector, which is typically composed of a rotating polygonal mirror, and the deflected light is sent into the scanning lens, which is typically composed of an fθ lens. The scanning lens has power not only in the main scanning direction but in the sub-scanning direction in association with the cylindrical lens. As a result, the light emerging from the scanning lens is converged at a point on the exposure plane in both the main and sub-scanning directions. A slit for producing a spot of a predetermined shape on the exposure plane is positioned behind the cylindrical lens, namely, in the optical path of anamorphic light. Hence, less light is reflected by the slit plate to return to the semiconductor laser. In addition, if the slit plate is formed as an integral part of the support frame of tee cylindrical lens, the number of necessary components and fabrication steps can be reduced to lower the production cost.

BRIEF DESCRIPTION OF THE DRAWINGS

FIGS. 6a and 6b are diagrams showing the optical paths of light travelling through cross sections in the main and sub-scanning directions, respectively, in the optical scanning apparatus shown in FIG. 5;

FIG. 12 is a perspective view of a second example of the collimator lens used in the present invention;

FIGS. 13a and 13b are perspective views of a third and a fourth example, respectively, of the collimator lens used in the present invention;

DETAILED DESCRIPTION OF THE PREFERRED EMBODIMENT

Figure 18:
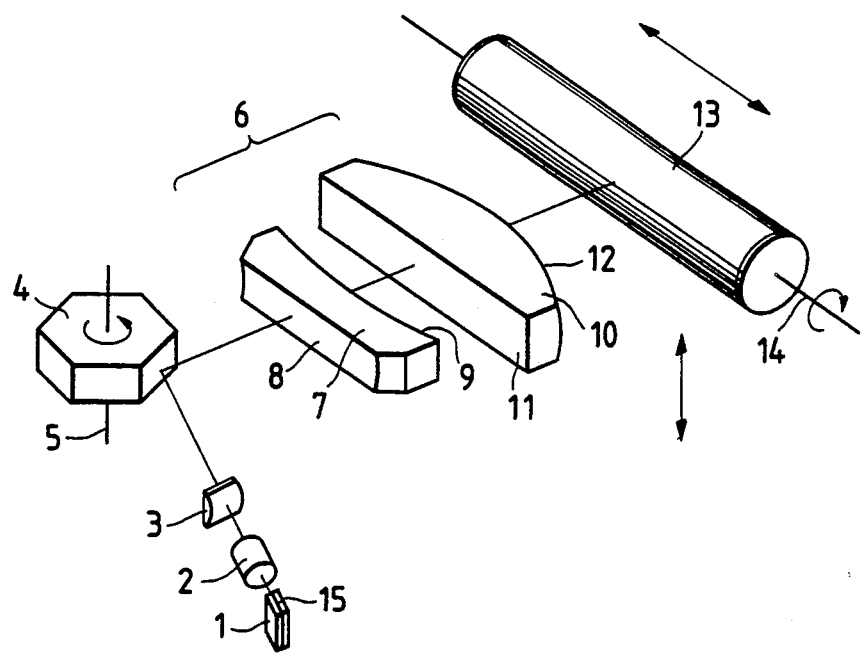
FIG. 18 is a perspective view of an optical scanning apparatus to which the present invention is applied.

FIG. 18 shows an optical scanning apparatus for use with a laser beam printer that was previously proposed by the assignee in Unexamined Published Japanese Patent Application No. 63-146015.

The apparatus shown in FIG. 18 comprises the following components: a semiconductor laser 1 which emits laser light for recording information; a collimator lens 2 which converts the divergent laser light from the semiconductor laser 1 into parallel rays of light; a convex cylindrical lens 3 as an anamorphic optical unit which does not have power in the main scanning direction (i.e., direction parallel to the axis 14 of a drum 13 to be described below) and which has power only in the sub-scanning direction (i.e., direction perpendicular to the axis 14 of the drum 13); a rotating polygonal mirror 4 as a deflector which is rotated about its axis 5; and an fθ lens 6 as a scanning lens which is composed of a spherical cylindrical lens 7 and a toric lens 10. The surface 8 of the spherical cylindrical lens 7 on the side facing the rotating polygonal mirror 4 is cylindrical and has a negative curvature in a cross section in the sub-scanning direction whereas the opposite surface 9 of the spherical cylindrical lens 7 is spherical in concave form. The surface 11 of the toric lens 10 on the side facing the spherical cylindrical lens 7 is planar whereas the opposite surface 12 has curvature in both the main and sub-scanning directions so as to provide an anamorphic action. The curvature (or the radius of curvature) of surface 12 in the sub-scanning direction is stronger (or smaller in terms of curvature radius) than in the main scanning direction. The apparatus shown in FIG. 18 also includes a drum 13 which is rotated about an axis 14 in the sub-scanning direction and its surface provides an exposure plane.

Figure 7:
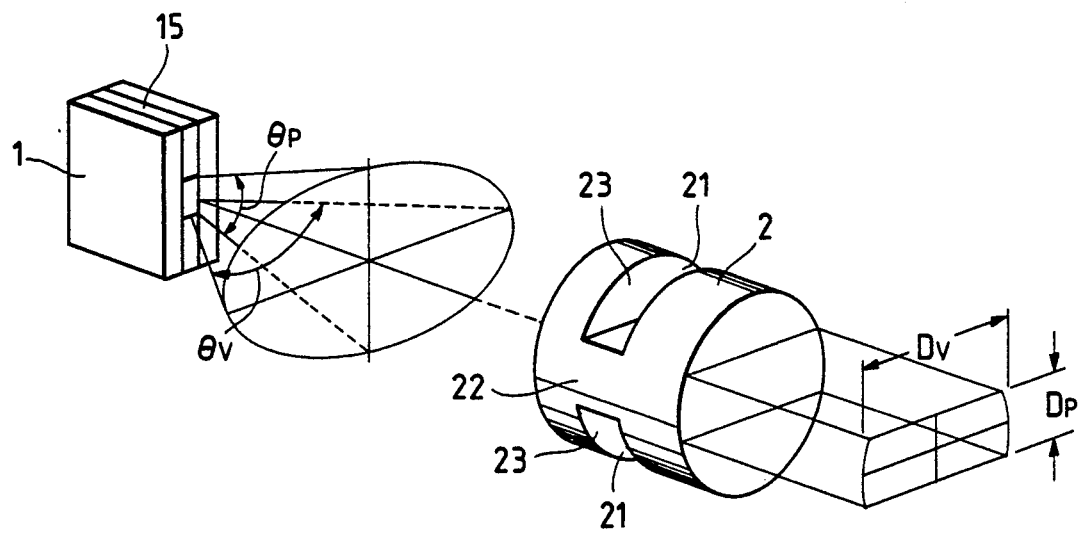
FIG. 7 is a perspective view showing the semiconductor laser and collimator lens used in the optical scanning apparatus of the present invention.
Figure 19A:
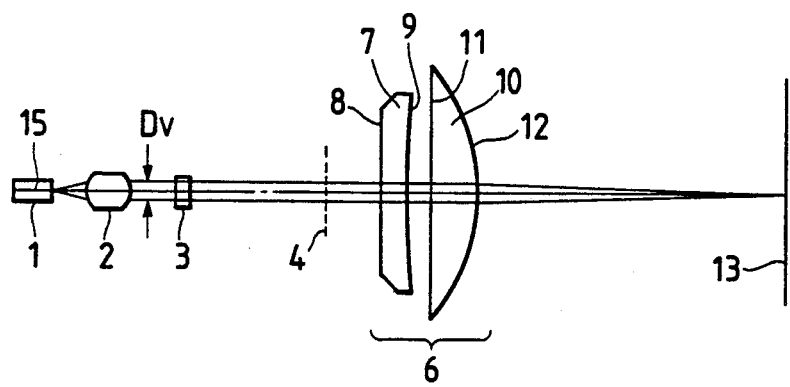
FIGS. 19a and 19b are diagrams showing the optical paths of light travelling in the main and sub-scanning directions, respectively, in the optical scanning apparatus shown in FIG. 18.
Figure 19B:
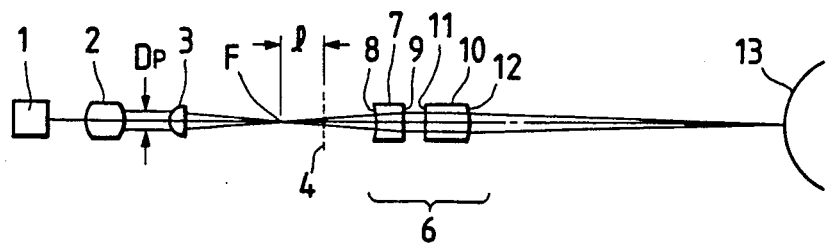

The laser light emitted from the semiconductor laser 1 is collimated by the collimator lens 2. As shown in FIG. 7, the semiconductor laser 1 will emit laser light in such a way that the angle of divergence, $\theta v$, in a direction perpendicular to the junction plane 15 is wider than the angle of divergence, $\theta p$, in a direction parallel to the junction plane 15 ($\theta v > \theta p$). On account of this characteristic of the semiconductor laser, the diameter D of the beam emerging from the collimator lens 2 is such that the diameter of a cross section, Dv, in a direction perpendicular to the junction plane 15 is greater than the diameter of a cross section, Dp, in a direction parallel to the junction plane 15 (see FIGS. 19a and 19b).

The parallel rays of light emerging from the collimator lens 2 are sent into the cylindrical lens 3. The cylindrical lens 3 has power only in the sub-scanning direction and does not have power in the main scanning direction, so the rays of light in a cross section in the main scanning direction remain parallel when they emerge from the cylindrical lens 3 (see FIG. 19a) but the rays of light in a cross section in the sub-scanning direction are converged at point F which is ahead of a reflecting surface of the rotating polygonal mirror 4 by a distance l (see FIG. 19b). The light that has been subjected to the anamorphic action described above is reflected by the rotating polygonal mirror 4 and illuminates the drum 13 after passing through the f$\theta$ lens 6. The direction of light reflection changes in accordance with the rotation of the polygonal mirror 4, so the spot formed on the surface of the drum 13 will move in the main scanning direction.

If the angle of incidence, or the angle formed by the incident beam on the f$\theta$ lens 6 and the optical axis of the lens, is written as $\theta$, and if the image height, or the distance from the optical axis to the spot on the drum 13, and the focal length of the f$\theta$ lens are written as y and f, respectively, then the relationship $y = f\theta$ is established. In other words, the position of the spot in the main scanning direction is generally proportional to the angle of rotation of the polygonal mirror 4.

Further, the drum 13 rotates about its axis 14 in the sub-scanning direction, so that the dot row formed by the spot on the drum 13 during the main scanning direction moves successively in the sub-scanning direction.

In the main scanning direction, the surface 12 of the toric lens 10 acts in such a way as to converge the rays of light at a point on the drum 13. In the sub-scanning direction, the cylindrical lens 3, the surfaces 8 and 9 of the spherical cylindrical lens 7 and the surface 12 of the toric lens 10 cooperate to act in such a way as to converge the rays of light at a point on the drum 13. Since the semiconductor laser 1 is controlled in accordance with the information to be recorded, an image corresponding to that information will eventually be formed on the exposure plane of the drum 13.

Figures 3A, 3B:
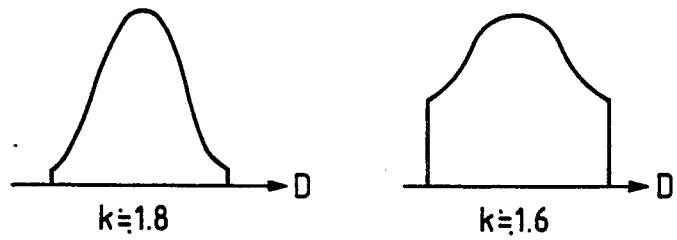
FIGS. 3a and 3b show how proportionality constant k differs with the distribution of the quantity of light.

The spot diameter S of light converged by the f$\theta$ lens is represented by:

$$S = k\lambda F = k\lambda f/D \qquad (1)$$

where $\lambda$ is the wavelength of light, F is an F number which is equal to the focal length f of the f$\theta$ lens divided by the diameter D of the incident beam, and k is a proportionality constant. As shown in FIG. 3, k assumes a greater value when less vignetting occurs in light distribution (FIG. 3a) than it does when extensive vignetting occurs (FIG. 3b).

Figure 4:
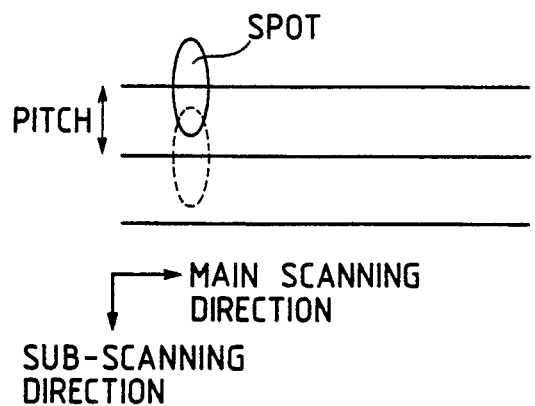
FIG. 4 illustrates the relationship between the shape of a beam spot and the direction of scanning.

As is obvious from equation (1), the spot diameter S is in inverse proportion to the diameter D of the incident beam if the focal length of the f$\theta$ lens is the same. If the main scanning direction coincides with the direction perpendicular to the junction plane 15, the spot diameter in the main scanning direction Sv is generally smaller than the spot diameter in the sub-scanning direction Sp (Sv < Sp). Hence, the spot on the drum 13 is short in the main scanning direction and long in the sub-scanning direction as shown in FIG. 4. Thus, if a scanning operation in the main scanning direction is followed by rotation of the drum 13 by a predetermined pitch to perform the next scanning operation, the two regions of scanning will partly overlap to avoid the occurrence of an unscanned region.

The system described above offers a particular advantage when the scanning lens unit is anamorphic and the cylindrical lens 3 allows light to be converged in the sub-scanning direction at a point ahead of the rotating polygonal mirror 4. Namely, satisfactory control over image point error can be accomplished even if the polygonal mirror 4 suffers the problem of "tilting" (i.e., a reflecting surface of the polygonal mirror 4 is no longer parallel to its axis 5). A further advantage of the construction described above is that the composite focal length of the lens unit (including the cylindrical lens and subsequent components) in the sub-scanning direction can be varied by changing the focal length of the cylindrical lens 3 with its imaging point in the sub-scanning cross section being held constant. Thus, the spot diameter Sp in the sub-scanning direction can be set at any value by properly selecting the focal length of the cylindrical lens 3. Details of this feature are given in Unexamined Published Japanese Patent Application No. 63-146015 and need not be described here.

Any variations in the angle of divergence of light emitted from the semiconductor laser 1 can be compensated for by changing the focal length of cylindrical lens 3, however, this is not an advantageous method since a number of cylindrical lenses 3 having different focal lengths must be provided. A more advantageous approach is to provide a slit (aperture) that permits the passage of a selected part of incident light. If there is much energy to use, the focal length of the cylindrical lens 3 may be preset at a comparatively small value and the slit is used to increase the spot diameter Sp in the sub-scanning direction in accordance with the scan pitch. This method has the advantage of using a single component to perform two functions.

Figure 5:
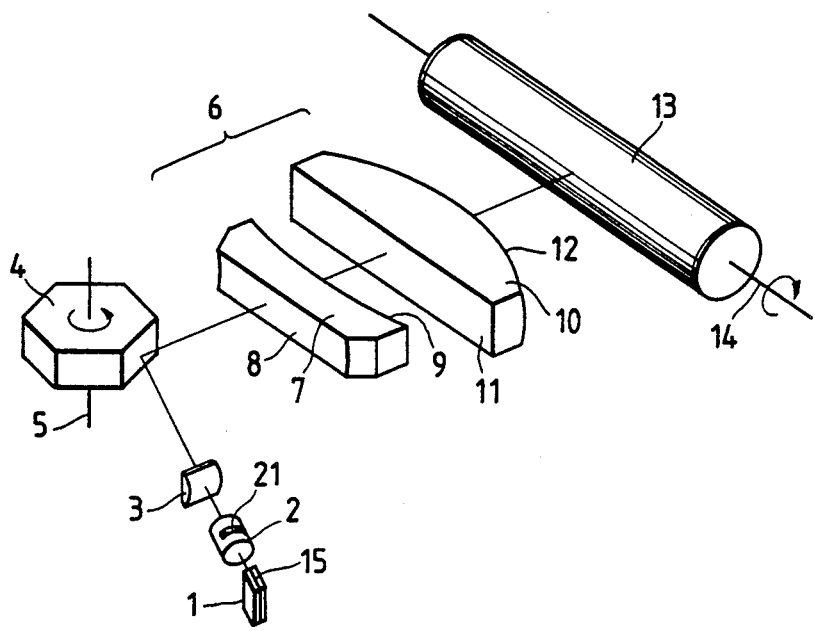
FIG. 5 is a perspective view of the optical scanning apparatus of the present invention.

FIG. 5 shows the optical scanning apparatus of the present invention which is to be used with a laser beam printer. It comprises the following components: a semiconductor laser 1 as a light source which emits laser light for recording information; a collimator lens 2 which converts the divergent laser light from the semiconductor laser 1 into parallel rays of light; a convex cylindrical lens 3 as an anamorphic optical unit which does not have power in the main scanning direction (parallel to the axis 14 of a drum 13 to be described below) and which has power only in the sub-scanning direction (perpendicular to the axis 14 of the drum 13); a rotating polygonal mirror 4 as a deflector which is rotated about its axis 5; and fθ lens 6 as a scanning lens which is composed of a spherical cylindrical lens 7 and a toric lens 10. The surface 8 of the spherical cylindrical lens 7 on the side facing the rotating polygonal mirror 4 is cylindrical and has a negative curvature in a cross section in the sub-scanning direction whereas the opposite surface 9 of the spherical cylindrical lens 7 is spherical in concave form. The surface 11 of the toric lens 10 on the side facing the spherical cylindrical lens 7 is planar whereas the opposite surface 12 has curvature in both the main and sub-scanning directions so as to provide an anamorphic action. The curvature (or the radius of the curvature) of surface 12 in the sub-scanning direction is stronger (or smaller in terms of curvature radius) than in the main scanning direction. The apparatus shown in FIG. 5 also includes a drum 13 which is rotated about its axis 14 in the sub-scanning direction and its surface provides an exposure plane.

By adopting the construction described above, an optical path is formed in both the main and sub-scanning directions as shown in FIGS. 6a and 6b.

Figure 1:
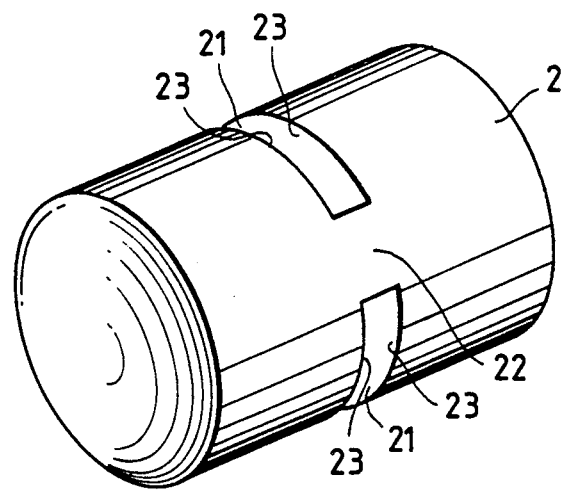
FIG. 1 is a perspective view of a first example of the collimator lens used in the optical scanning apparatus of the present invention.
Figure 2:
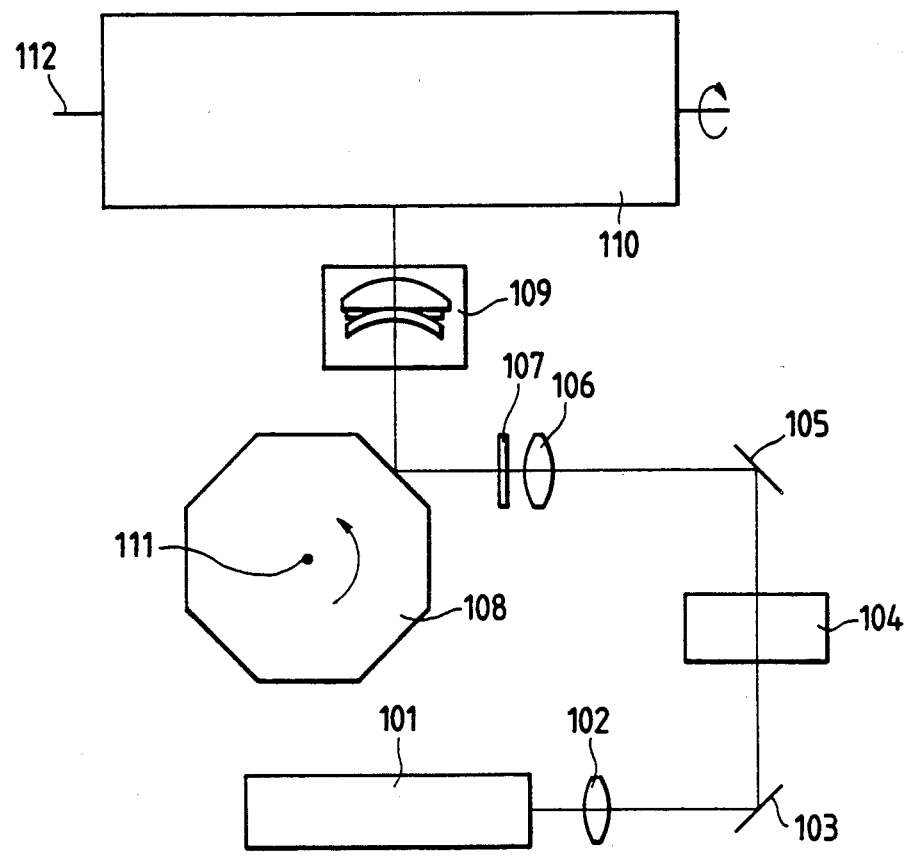
FIG. 2 is a diagram showing a prior art optical scanning apparatus.

The collimator lens 2 used in the apparatus of the present invention is constructed as shown in FIGS. 1 and 7. Shown by 21 in these drawings is a pair of grooves serving as means for limiting the width of a light beam. These grooves are formed from opposite sides toward the optical axis of the collimator lens 2 in a direction perpendicular to the optical axis. As a result, a connecting portion 22 is formed between the grooves 21. The collimator lens 2 having such grooves 21 and connecting portion 22 can be shaped from plastics using a suitable mold. If the collimator lens 2 is to be formed of glass, the grooves 21 can be made by glass-cutting or some other suitable method. While each of the grooves 21 is composed of surfaces 23, at least the surface facing the semiconductor laser 1 or the opposite surface is colored black or otherwise treated to substantially block the passage of laser light. As a result, a slit composed of the connecting portion 22 is substantially formed within the collimator lens 2.

Figure 8:
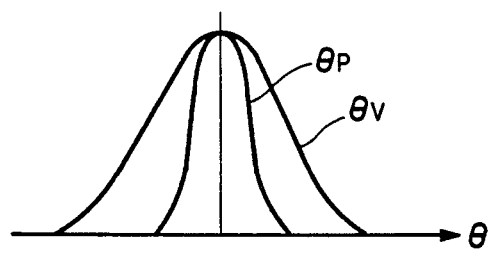
FIG. 8 is a characteristic diagram showing the distribution of light emitted from the semiconductor laser used in the optical scanning apparatus of the present invention.
Figure 9:
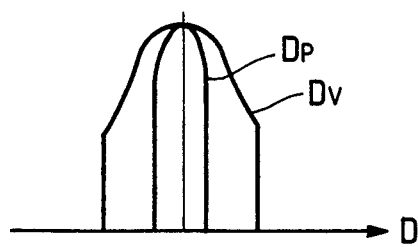
FIG. 9 is a characteristic diagram showing the distribution of light emerging from the collimator lens used in the optical scanning apparatus of the present invention.

As shown in FIG. 7, the laser light emitted from the semiconductor laser 1 spreads in such a way that the angle of divergence, $\theta$ v, in a direction perpendicular to the junction plane 15 is wider than the angle of divergence, $\theta$ p, in a direction parallel to the junction plane ($\theta$ v > $\theta$ p). Hence, the distribution of the quantity of laser light is sharper in a cross section parallel to the junction plane 15 than in a cross section perpendicular to it as shown in FIG. 8. These divergent rays of laser light are made parallel by the collimator lens 2 and the outside diameter of the collimated beam is equal to Dv in a cross section perpendicular to the junction plane 15 as it is restricted by the outside diameter of the collimator lens 2. On the other hand, in a cross section parallel to the junction plane 15, the outside diameter of the collimated beam is equal to Dp as it is restricted by the width of connecting portion 22 serving as a slit. The light emerging from the collimator lens 2 has a distribution of the type shown in FIG. 9. The distribution of the light is cut at both ends in each of the cross sections perpendicular and parallel to the junction plane 15.

Figure 10A:
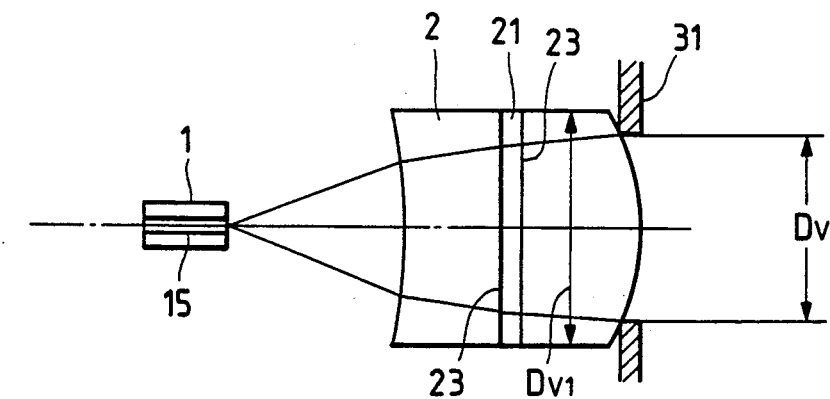
FIGS. 10a and 10b are diagrammatic cross-sectional views showing how the collimator lens used in the present invention operates in the main and sub-scanning directions, respectively.
Figure 10B:
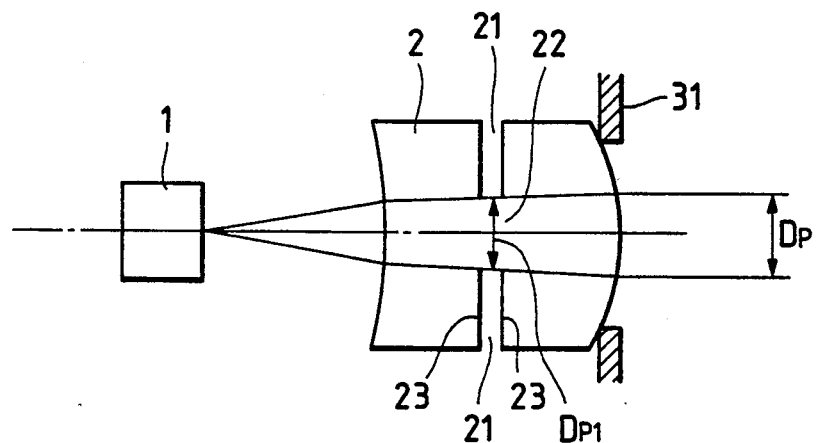
Figure 11:
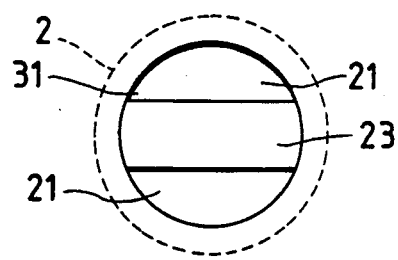
FIG. 11 is a front view of the collimator lens of the present invention as viewed looking into the optical axis.

FIGS. 10 and 11 are two-dimensional profiles of the beam passing through the collimator lens 2. If a positioning lens holder 31 is provided behind the collimator lens 2, the diameter of the collimated beam in a cross section perpendicular to the junction plane 15 is determined not by the outside diameter $Dv_1$ of the collimator lens 2 but by the diameter Dv of lens holder 31, as shown in FIG. 10a. In a cross section parallel to the junction plane 15, the light is still divergent, so the width of the collimated beam is restricted to Dp which is slightly greater than the width $Dp_1$ of the connection portion 22, as shown in FIG. 10b. Light that is incident outside the connecting portion 22 is reflected by the surfaces 23 of either groove 21. However, being divergent, the light falling on the surfaces 23 will not undergo specular reflection as in the case where a slit plate is positioned in the optical path of collimated light and practically none of the reflected light will return to the semiconductor laser 1.

The light emerging from the collimator lens 2 is sent into the cylindrical surface side of cylindrical lens 3. It is theoretically possible to position the cylindrical lens 3 in such a way that the light emerging from the collimator lens 2 is incident on the planar surface of the cylindrical lens. But this arrangement is not preferred since an increased amount of light will be reflected on the incident plane (planar side) of the cylindrical lens, causing a corresponding increase in the amount of light returning to the semiconductor laser 1. The cylindrical lens 3 has power only in the sub-scanning direction and not in the main scanning direction. Hence, the rays in a cross section in the main scanning direction remain parallel when they emerge from the cylindrical lens 3 (see FIG. 6a) but the rays in a cross section in the sub-scanning direction will be converged at point F which is ahead of a reflecting surface of the polygonal mirror 4 by a distance l (see FIG. 6b). The light that has been subjected to the anamorphic action described above is reflected by the rotating polygonal mirror 4 and illuminates the drum after passing through the fθ lens 6. The direction of light reflection changes in accordance with the rotation of the polygonal mirror 4, so the spot formed on the surface of the drum 13 will move in the main scanning direction. As already mentioned, the fθ lens 6 insures that the position of the spot in the main scanning direction is generally proportional to the angle of rotation of the polygonal mirror 4.

Further, the drum 13 rotates about its axis 14 in the sub-scanning direction, so the spot on the drum 13 will move successively in the sub-scanning direction.

In the main scanning direction, the surface 12 of the toric lens 10 acts in such a way as to converge the rays of light for scanning over the surface of the drum 13. In the sub-scanning direction, the cylindrical lens 3, the surfaces 8 and 9 of the spherical cylindrical lens 7 and the surface 12 of the toric lens 10 cooperate to act in such a way as to converge the rays of light for scanning over the surface of the drum 13. Since the semiconductor laser 1 is controlled in accordance with the information to be recorded, an image corresponding to that information will eventually be formed on the exposure plane of the drum 13.

As already mentioned, the spot diameter is in inverse proportion to the diameter of the incident light beam launched in the fθ lens. Thus, the shape of the spot can be adjusted to become short in the main scanning direction and long in the sub-scanning direction by controlling the size of the connecting portion 22 in such a way that the slit it defines is long in the main scanning direction and short in the sub-scanning direction.

It is theoretically possible to position the semiconductor laser 1 in such a way that the length of the slit is generally perpendicular to the major axis of the beam launched into the slit (i.e., the junction plane 15 becomes parallel to the main scanning direction). In this case, the beam emerging from the slit will have the same cross-sectional shape but the efficiency of utilization of the light will decrease. Thus, the semiconductor laser 1 is preferably positioned in such a way that the major axis of the beam will become generally parallel to the length of the slit.

If the scanning lens unit is anamorphic as described above and if the cylindrical lens 3 allows light to be converged in the sub-scanning direction at a point ahead of the rotating polygonal mirror 4, the system of the present invention offers a particular advantage in that it performs satisfactory control over image point error even if the polygonal mirror 4 suffers the problem of "tilting" (i.e., a reflecting surface of the polygonal mirror 4 is no longer parallel to its axis 5).

FIG. 12 shows another example of the collimator lens to be used in the present invention. In this example, the collimator lens is formed as a generally rectangular prismatic shape. The collimator lens of this shape can be mounted on a support frame or other retaining member more easily than the collimator lens shown in FIG. 1 which has a generally cylindrical shape.

Figure 14:
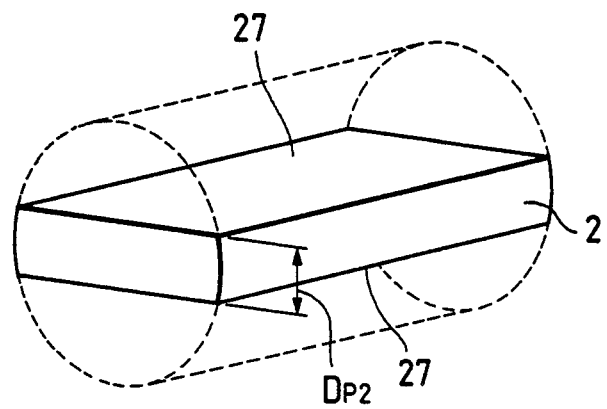
FIG. 14 is a perspective view of a fifth example of the collimator lens used in the present invention.

FIGS. 13 and 14 show still other examples of the collimator lens to be used in the present invention. In the example shown in FIG. 13, a step defined by a surface 25 perpendicular to the optical axis and two surfaces 26 parallel to the optical axis is formed as a means for limiting the light travelling in the sub-scanning direction. The step may be provided either on the side where light emerges from a generally cylindrical collimator lens 2 (see FIG. 13a) or on the side where light is sent onto the collimator lens 2 (see 13b). The distance $DP_2$ between the surfaces 26 is set to a predetermined value which restricts the width of a light beam travelling in the sub-scanning direction. As in the case where grooves are formed to define a slit, surface 25 (and also surfaces 26 as required) are colored black or otherwise treated to substantially block the passage of light. The same purpose can be attained by a holding member (to be described below) which is to be joined to those surfaces.

In the case where the light limiting means is defined by grooves, a fairly complex mold must be used to insure that the collimator lens shaped of a synthetic resin can be easily removed from the mold. On the other hand, the collimator lenses shown in FIG. 13 have the advantage that they can be shaped in a comparatively simple mold. In addition, these collimator lenses have a circular portion, so that members for retaining them can be formed of a round-shaped article which is easy to work. Further, these collimator lenses are suitable for use with a round semiconductor laser.

In the example shown in FIG. 14, a collimator lens having a generally cylindrical shape is cut off at two surfaces 27 that are parallel to the optical axis and that are spaced apart by a distance $DP_2$. Since the surfaces 27 are planar, the collimator lens shown in FIG. 14 can be retained by a tabular holding member and the resulting simplified design contributes to a reduction in the overall size of the system. This example of a collimator lens is suitable for use with a semiconductor laser having a tabular flange.

Figure 15:
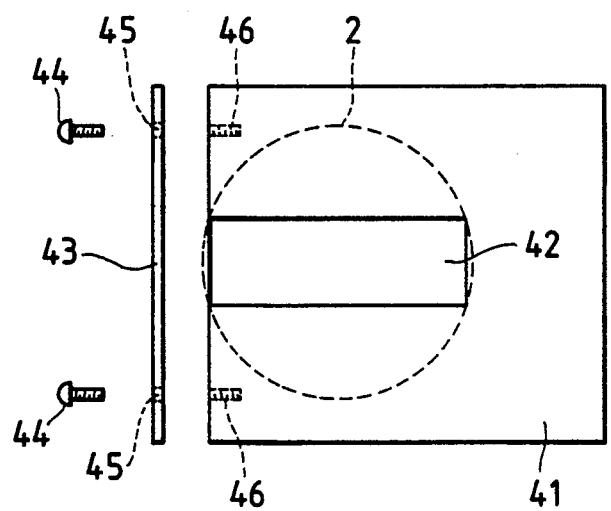
FIG. 15 is a front view of an example of the support frame for retaining the collimator lens of the present invention.
Figure 16:
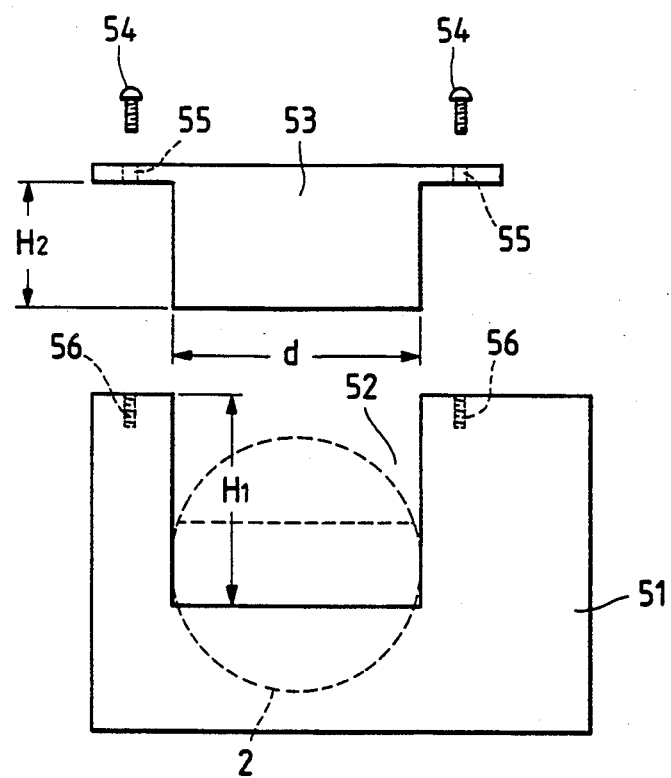
FIG. 16 is a front view of another example of the support frame.
Figure 17:
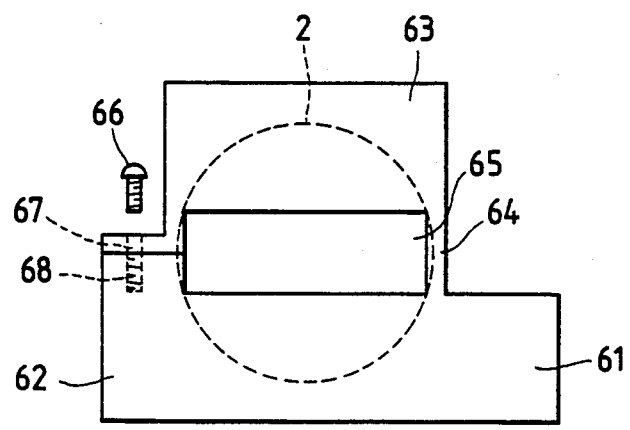
FIG. 17 is a front view of a still another example of the support frame.

FIGS. 15 to 17 show various constructions of a member for retaining the collimator lens 2. In the example shown in FIG. 15, a groove 42 is formed in a support frame 41. In order that the portion of collimator lens 2 which has different diameters in the main and sub-scanning directions (i.e., the connecting portion 22 in the examples shown in FIGS. 1, 6, 7, 10 and 12, or the tabular portion defined by surfaces 26 in the example shown in FIG. 13, or the tabular portion defined by surfaces 27 in the example shown in FIG. 14) can be fitted into the groove 42, the width and depth of the groove 42 are generally equal to the corresponding dimensions of each of these portions. If the support frame 41 is formed of a black synthetic resin, it blocks the passage of laser light by facing the surfaces 23 of the groove 21 in the collimator lens 2 in the examples shown in FIGS. 1, 7 and 10 through 12. In other words, there is no need to color the surfaces 23 black or otherwise treat it to block the passage of laser light. In order to insure that the collimator lens 2 fitted into the groove 42 will not be dislodged from the support frame 41, a member 43 is fixed to the support frame 41 in such a way as to block the groove 42. To this end, screws 44 are threaded into holes 46 in the support frame 41 through holes in the member 43.

In the example shown in FIG. 16, a cutout 52 having a depth $H_1$ and a width d is formed in a support frame 51. A member 53 having a width d and a height $H_2$ that is capable of being fitted into the cutout 52 is separately provided. The difference between depth $H_1$ and height $H_2$ is generally equal to the width of the tabular portion of the collimator lens 2. After the tabular portion of the collimator lens 2 is fitted into the cutout 52, the member 53 is fitted into the cutout 52, and screws 54 are threaded into holes 56 in the support frame 51 through holes 55 in the member 53, to thereby support the collimator lens 2 on the frame 51.

In the example shown in FIG. 17, a support frame 61 consists of a lower member 62 and an upper member 63 which are connected by an arm 64. A hole 65 is formed between the lower member 62 and the upper member 63. The arm 64 is capable of elastic deformation, so by pivoting the upper member 63 clockwise with the arm 64 serving as the fulcrum, the hole 65 becomes larger and the tabular portion of the collimator lens 2 can be fitted into the enlarged hole 65. Subsequently, the upper member 63 is pivoted counterclockwise and a screw 66 is threaded into a hole 68 in the lower member 62 through a hole 67 in the upper member 63. Thus, the collimator lens 2 is securely fixed to the support frame 61.

Like the support frame shown in FIG. 15, those shown in FIGS. 16 and 17 are capable of not only retaining the collimator lens 2 but also blocking the passage of laser light.

It should be noted here that the concept of the present invention is also applicable to the case where no cylindrical lens is provided behind the collimator lens, with the fθ lens being composed of a spherical lens.

As described above, the optical scanning apparatus of the present invention is so constructed that at least part of the collimator lens which collimates the divergent light emitted from a light source has a beam limiting portion that is shaped to have different diameters in the main and sub-scanning directions. Hence, unlike in the case where a slit plate is positioned in the optical path of parallel rays of light, specular reflection of light will not take place and the amount of light returning to the light source can be significantly reduced. This contributes to stable operation of the light source such as a semiconductor laser. Further, there is no need to provide a separate slit plate and this leads to a simplified system design by reducing the number of necessary components. As a consequence, the number of fabrication steps involved, and thus the production cost can be reduced.

The optical scanning apparatus of a second embodiment of the present invention has a basic construction which is the same as that shown in FIG. 18. In this apparatus, however, a slit of the type shown in FIGS. 20 and 21 is provided behind the cylindrical lens to form an optical path of the type shown in FIG. 22.

Figure 20:
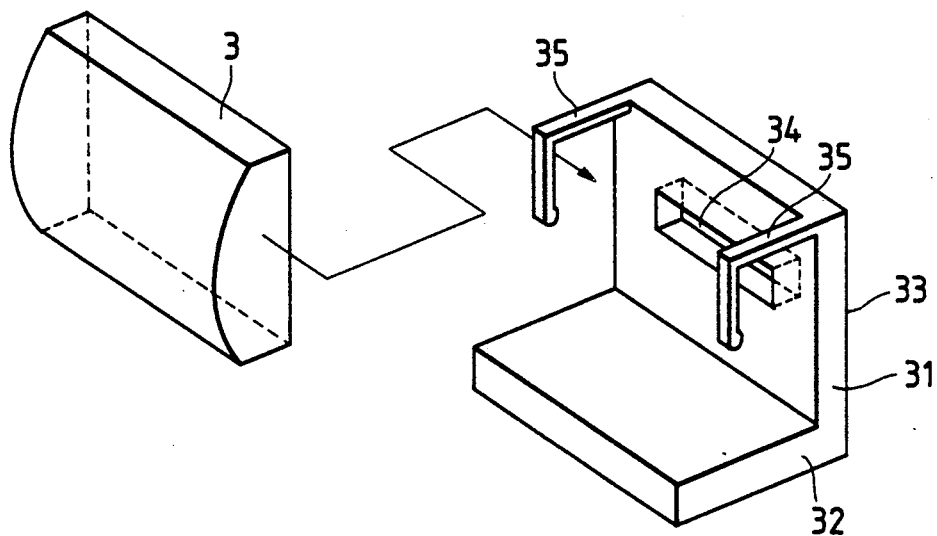
FIG. 20 is a diagram showing in an assembled state the support frame of the cylindrical lens used in the optical scanning apparatus of the present invention.
Figure 21:
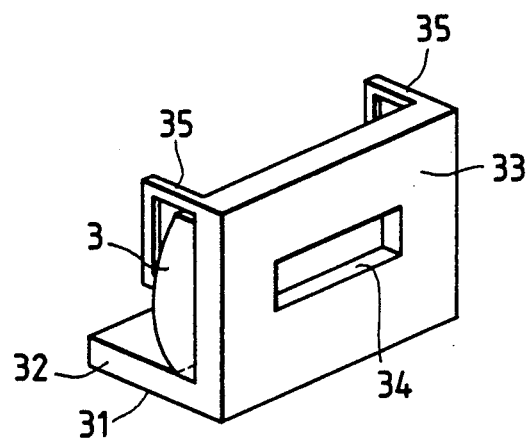
FIG. 21 is a perspective view of the support frame which is used in the present invention and which has a cylindrical lens mounted thereon.

Shown by 31 in FIG. 20 is a support frame of the cylindrical lens 3 which may be made of a synthetic resin, a metal, etc. The support frame 31 is composed of a supporting section 32 which is to be mounted on a chassis, pedestal or some other suitable member and a mounting section 33 which is generally perpendicular to the supporting section 32. A slit 34 is formed in the mounting section 33 which section also serves as a slit plate. Shown by 35 is a pair of arms which are formed as an integral part of the mounting section 33 to support the cylindrical lens 3. Slit 34 is formed in such a way that its length is parallel to the main scanning direction. The cylindrical lens 3 is mounted on the mounting section 33 in such a way that the planar side of the lens is in close contact with the mounting section. In mounting the cylindrical lens 3, the arms 35 deform elastically to facilitate the mounting procedure. After it is mounted, the cylindrical lens 3 is held in position by the elastic force of the arms 35. If the urging force of the arms 35 is weak, an adhesive (double-sided adhesive tape or some other suitable means) may be used to securely fix the cylindrical lens 3. It is theoretically possible to mount the cylindrical lens 3 in such a way that its convex cylindrical face is directed toward the mounting section 33 but this does not insure stable mounting of the cylindrical lens. Thus, it is preferred that the planar side of the cylindrical lens is brought into close contact with the mounting section 33.

Figure 23:
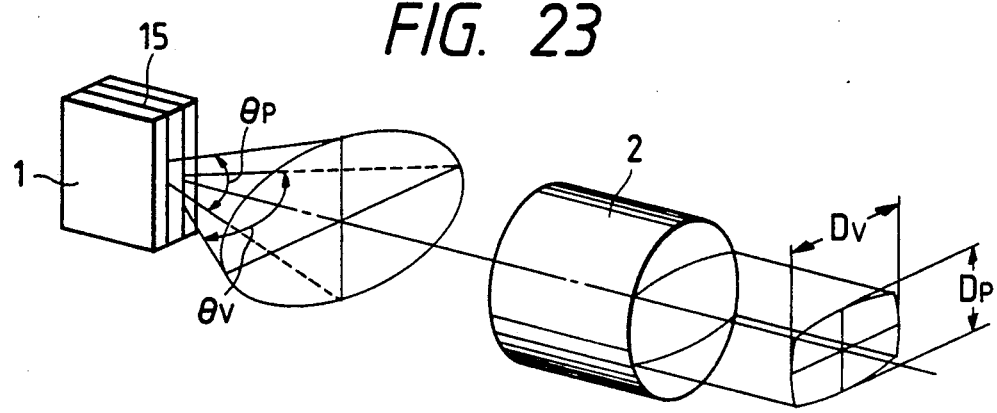
FIG. 23 is a perspective view illustrating the action of a collimator lens.

As shown in FIG. 23, the laser light emitted from the semiconductor laser 1 spreads in crossed directions and the angle of spread, $\theta$ v, in a direction perpendicular to the junction plane 15 is greater than the angle of spread, $\theta$ p, in a direction parallel to the junction plane 15. Hence, the distribution of the quantity of laser light is sharper in a cross section parallel to the junction plane 15 than in a cross section perpendicular to it as shown in FIG. 8. The rays of emitted laser light are made parallel by the collimator lens 2, with part of the light at both ends of the cross section perpendicular to the junction plane 15 being blocked by the collimator lens 2. On the other hand, the occurrence of such vignetting is very small in the cross section parallel to the junction plane 15. Hence, the light emerging from the collimator lens 2 has a distribution of the type shown in FIG. 9: it has a sharp and continuous distribution in the cross section parallel to the junction plane 15 but a broad distribution in the cross section perpendicular to the junction plane 15 and is cut to become discontinuous at both ends. The light emerging from the collimator lens 2 is sent into the cylindrical lens 3 from the side of its cylindrical surface. It is theoretically possible to position the cylindrical lens 3 in such a way that the light emerging from the collimator lens 2 is incident on the planar surface of the cylindrical lens. But this arrangement is not preferred since an increased amount of light will be reflected on the incident plane (planar side) of the cylindrical lens, causing a corresponding increase in the amount of light returning to the semiconductor laser 1.

Figure 22A:
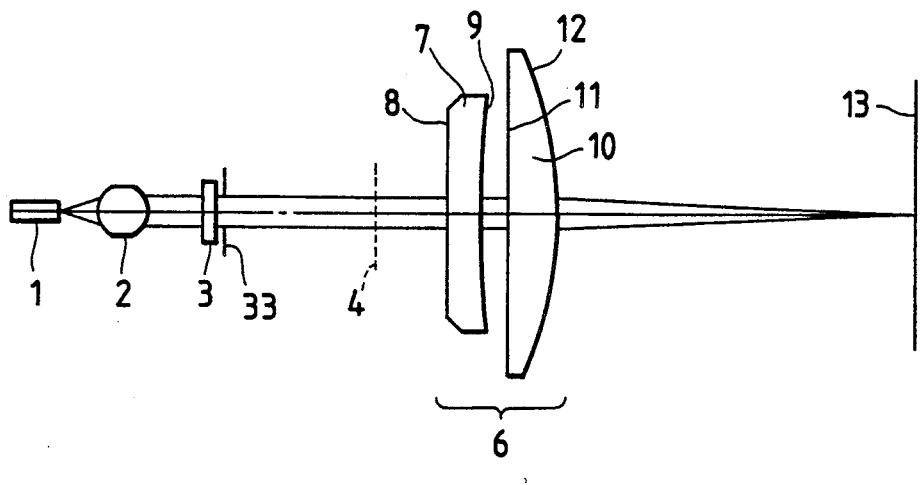
FIG. 22 is a diagram showing the optical paths of light travelling in the main and sub-scanning directions, respectively, in an optical scanning apparatus according to an embodiment of the present invention.
Figure 22B:
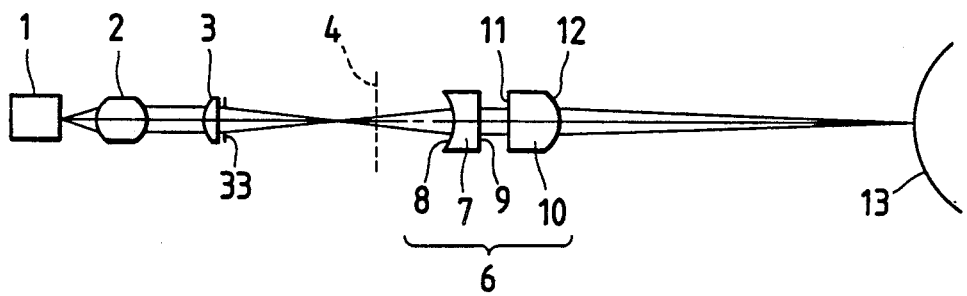

The cylindrical lens 3 is positioned in such a way that it has power only in the sub-scanning direction. Hence, in a cross section in the main scanning direction, light emerges from the cylindrical lens 3 without being subjected to any lens action as shown in FIG. 22a, but in a cross section in the sub-scanning direction, the emerging light is converged as shown in FIG. 22b. The cross-sectional shape of the light emerging from the cylindrical lens 3 is defined by the slit 34 formed in the mounting face 33. Part of the emerging light is reflected on the mounting face 33 but the rays of light falling on this face are not parallel and are instead converged at least in a cross section in the sub-scanning direction. Hence, only a small portion of the light will return to the semiconductor laser 1.

Figure 24:
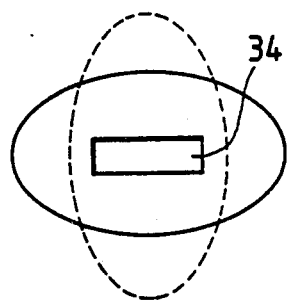
FIG. 24 is a diagram showing the relationship between the slit formed in accordance with the present invention and the cross-sectional shape of a laser beam.

It is theoretically possible to position the semiconductor laser 1 in such a way that the length of slit 34 is generally perpendicular to the major axis of the beam launched into the slit 34 (i.e., the junction plane 15 becomes parallel to the main scanning direction) as shown by a dashed line in FIG. 24. In this case, the beam emerging from the slit 34 will have the same cross-sectional shape but the efficiency of utilization of the light will decrease. Thus, the semiconductor laser 1 is preferably positioned in such a way that the major axis of the beam will become generally parallel to the length of the slit 34 as shown by a solid line in FIG. 24.

Thus, a light beam having a cross-sectional shape which is longer in the main scanning direction than in the sub-scanning direction emerges from the slit 34 and is converged to illuminate the surface of drum 13 via rotating polygonal mirror 4 and f$\theta$ lens 6. As already mentioned, the diameter of the beam spot on the drum 13 is in inverse proportion to the diameter of the incident beam sent into the f$\theta$ lens 6, so the spot formed on the drum surface is short in the main scanning direction and long in the sub-scanning direction.

Figure 25:
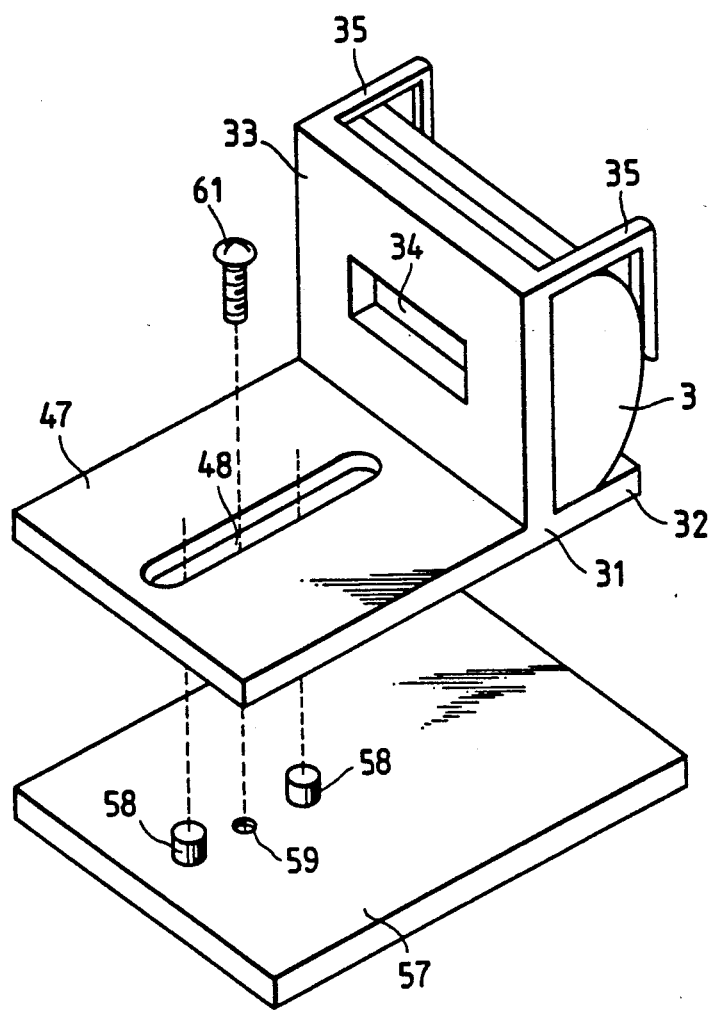
FIG. 25 is a perspective view showing another example of the support frame of the cylindrical lens to be used in the present invention.

FIG. 25 shows another example of the second embodiment of the present invention. Shown by 47 is a supporting section which extends from a mounting section 33 in a direction opposite to a supporting section 32. A slit (elongated hole) 48 is formed in the supporting section 47. A pedestal 57 on which to mount the cylindrical lens 3 is fixed to a chassis, base member or the like (not shown) or formed as an integral part thereof. Pins 58 are formed on the pedestal 57 in such a way that they can be inserted through the slit 48 in the supporting section 47. A hole 59 is capable of threadable engagement with a screw 69 inserted through the slit 48.

The pedestal 57 is positioned in such a way that the line connecting the centers of two pins 58 will coincide with the optical axis of laser light when viewed from above. The procedure of assembling the system in FIG. 25 starts with supporting the cylindrical lens 3 by arms 35. Thereafter, the supporting section 47 is placed on the pedestal 57 in such a way that pins 58 are inserted through the slit 48. Further, the screw 69 is lightly threaded into the hole 59 via the slit 48 so that the support frame 31 is temporarily secured to the pedestal 57. Thereafter, the support frame 31 is adjusted by moving it along the optical axis of laser light. Since the slit 48 is guided by pins 58 and because the support frame 31 is lightly pressed against the pedestal 57 by means of screw 69, said support frame can be smoothly moved to a desired position without chattering. When the cylindrical lens 3 comes to a position where rays of laser light in the sub-scanning direction are converged at a point which is ahead of the polygonal mirror 4 by a predetermined distance 1 and where the image in the sub-scanning direction is focused on the surface of drum 13, the screw 69 is further rotated until the support frame 31 is completely secured onto the pedestal 57.

It is theoretically possible to form the slit 48 in the supporting section 32 rather than in the supporting section 47. But in this case, fingers, jigs, etc. may contact the cylindrical lens 3 during assembling and adjusting procedures and this may soil or even damage the cylindrical surface of the lens. To avoid this problem, the slit 48 is preferably formed in the supporting section 47 as shown in FIG. 25.

If the supporting section 47 has a sufficient thickness, a guide groove that engages pins 58 may be formed in the bottom surface of the supporting section 47. Needless to say, projections may be formed in place of pins 58. If desired, pins or projections may be formed on the supporting section 47 whereas a slit or a guide groove is formed in the pedestal 57.

In the examples described above, slit 34 is formed in the support frame 31 on which the cylindrical lens 3 is to be mounted and this enables the number of necessary components and fabrication steps to decrease compared to the case where a separate slit plate is provided.

Figure 26:
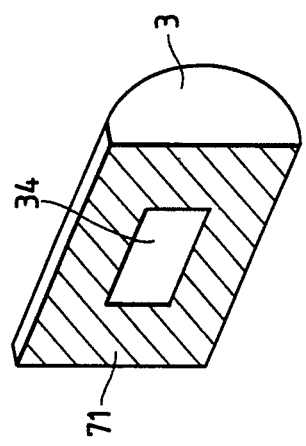
FIG. 26 is a perspective view showing another example of the slit to be formed in accordance with the present invention.
Figure 27A:
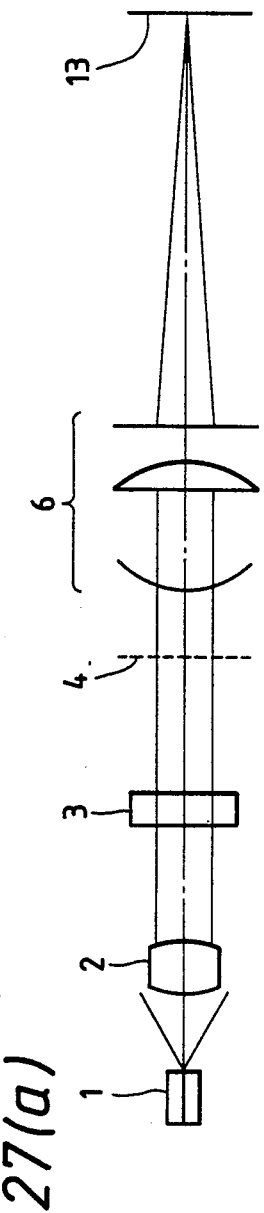
FIGS. 27a and 27b are diagrams showing the optical paths of light travelling in the main and sub-scanning directions, respectively, in an optical scanning apparatus according to another embodiment of the present invention.
Figure 27B:
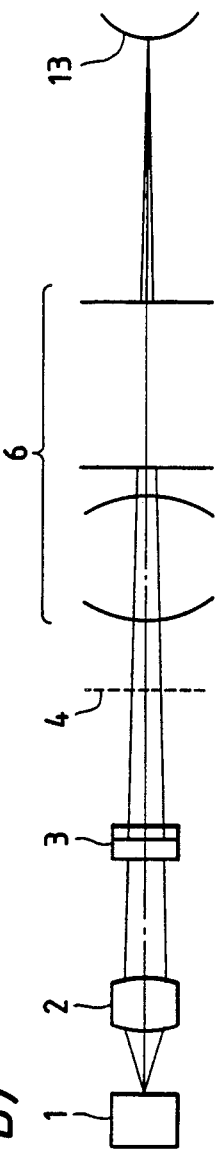

FIG. 26 shows still another example of the second embodiment of the present invention, in which slit 34 is formed by providing a light-shielding surface 71 in part of the planar side of the cylindrical lens 3 by a suitable method such as by coloring it black. In this embodiment, there is no need to form a slit in the support frame.

In actual operation of an optical scanning system, the power of the cylindrical lens 3 may be weaker than in the case shown in FIG. 19 and the fθ lens 6 may be designed to have anamorphic characteristics. In this case, the focal length, fp, of the fθ lens 6 in the sub-scanning direction can be made shorter than its focal length, fv, in the main scanning direction, with the attendant advantage that the image point error that may occur in the sub-scanning direction on account of tilting can be reduced compared to the case where the scanning lens is composed of a spherical lens unit having a focal length of fv. Details of this feature are given in a prior patent such as Unexamined Published Japanese Patent Application No. 61-245129 and need not be repeated here. The concept of the present invention is also applicable to this special case.

As described above, the optical scanning apparatus of the present invention is so constructed that a slit which defines the shape of a beam spot to be formed on the drum surface is positioned behind the anamorphic optical unit, so that the slit is positioned in the optical path of light which converges in at least one direction. Hence, compared to the case where the slit is positioned in the optical path of parallel rays of light, less light will be reflected by the slit plate to return to the semiconductor laser. This insures stable operation of the semiconductor laser.

In addition, if the slit plate is formed as an integral part of the support frame of the anamorphic optical unit, the number of necessary components and fabrication steps can be reduced to lower the production cost.

What is claimed is:

1. An optical scanning apparatus comprising:
    a light source emitting recording laser light;
    a collimator lens for collimating the laser light emitted from the light source;
    a deflector with which the laser light emerging from the collimator lens is deflected in a main scanning direction; and
    a scanning lens with which the laser light deflected by the deflector is converged to scan an exposure plane moving in a sub-scanning direction, at least part of said collimator lens being shaped to have different diameters in the main and sub-scanning directions.

2. An optical scanning apparatus according to claim 1, wherein said collimator lens has a pair of grooves serving as a means for limiting a width of said laser light.

3. An optical scanning apparatus according to claim 2, wherein said grooves are formed from opposite sides of said collimator lens and toward an optical axis of said collimator lens in a direction perpendicular to said optical axis.

4. An optical scanning apparatus according to claim 3, wherein said collimator lens has a generally cylindrical shape.

5. An optical scanning apparatus according to claim 3, wherein said collimator lens has a generally rectangular shape.

6. An optical scanning apparatus according to claim 1, wherein said collimator lens has a step defined by a surface perpendicular to an optical axis and two surfaces parallel to the optical axis.

7. An optical scanning apparatus according to claim 1, wherein said collimator lens has a generally cylindrical shape and has been cut off at two surfaces that are parallel to an optical axis of said collimator lens.

8. An optical scanning apparatus comprising:
    a semiconductor laser emitting a divergent laser light;
    a collimator lens for collimating the divergent laser light emitted from the semiconductor laser;
    an anamorphic optical unit that does not have power in a cross section of the laser beam emerging from the collimator lens in a main scanning direction but which has power in a cross section in a sub-scanning direction;
    a deflector with which the laser light emerging from the anamorphic optical unit is deflected in the main scanning direction;
    an anamorphic scanning lens unit that converges the laser light from the deflector to scan an exposure plane and which has different degrees of power in the main and sub-scanning directions; and
    a slit positioned in the optical path of light converged by the anamorphic optical unit.

9. An optical scanning apparatus according to claim 8, wherein said slit is formed as an integral part of a support frame of said anamorphic optical unit.

10. An optical scanning apparatus according to claim 8, wherein the length of said slit is aligned with a axis of said laser light emitted from said semiconductor laser.

11. An optical scanning apparatus according to claim 8, wherein said slit is formed by providing a light-shielding surface on a portion of a planar side of said anamorphic optical unit.

* * * * *